(12) United States Patent
Kessler

(10) Patent No.: US 7,143,582 B2
(45) Date of Patent: Dec. 5, 2006

(54) METHOD FOR OPERATION OF A BURNER AND BURNER IN PARTICULAR FOR A GAS TURBINE

(75) Inventor: Alfred Kessler, Heroldsberg (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 10/497,193

(22) PCT Filed: Jan. 8, 2003

(86) PCT No.: PCT/EP03/00109

§ 371 (c)(1),
(2), (4) Date: May 27, 2004

(87) PCT Pub. No.: WO03/060301

PCT Pub. Date: Jul. 24, 2003

(65) Prior Publication Data
US 2005/0000219 A1    Jan. 6, 2005

(30) Foreign Application Priority Data
Jan. 21, 2002    (EP)    .................................. 02001456

(51) Int. Cl.
F02C 3/30    (2006.01)

(52) U.S. Cl. .......................................... 60/775; 60/39.55
(58) Field of Classification Search ............... 60/39.53, 60/39.54, 39.55, 39.58, 39.59, 775; 431/4, 431/190
See application file for complete search history.

(56) References Cited

U.S. PATENT DOCUMENTS

| 4,600,151 A | 7/1986 | Bradley |
| 4,977,740 A | 12/1990 | Madden et al. |
| 5,617,716 A * | 4/1997 | Schreiber et al. ............. 60/775 |
| 5,697,209 A * | 12/1997 | Wettstein ................... 60/39.53 |

FOREIGN PATENT DOCUMENTS

| DE | 36 14 243 A1 | 10/1987 |
| DE | 42 12 810 A1 | 10/1992 |
| DE | 195 20 292 A1 | 12/1996 |
| DE | 195 35 370 A1 | 3/1997 |
| DE | 198 55 069 A1 | 5/2000 |
| WO | WO 89/08803 | 9/1989 |

* cited by examiner

*Primary Examiner*—L. J. Casaregola

(57) ABSTRACT

The invention relates to a method for operation of a burner, whereby a mixture used for burning is supplied to the burner in a two-stage process. In a first step atomised water is mixed with combustion air and said mixture is mixed with a fuel in a second step and then supplied to the burner. Said burner comprises means for carrying out the above method.

7 Claims, 1 Drawing Sheet

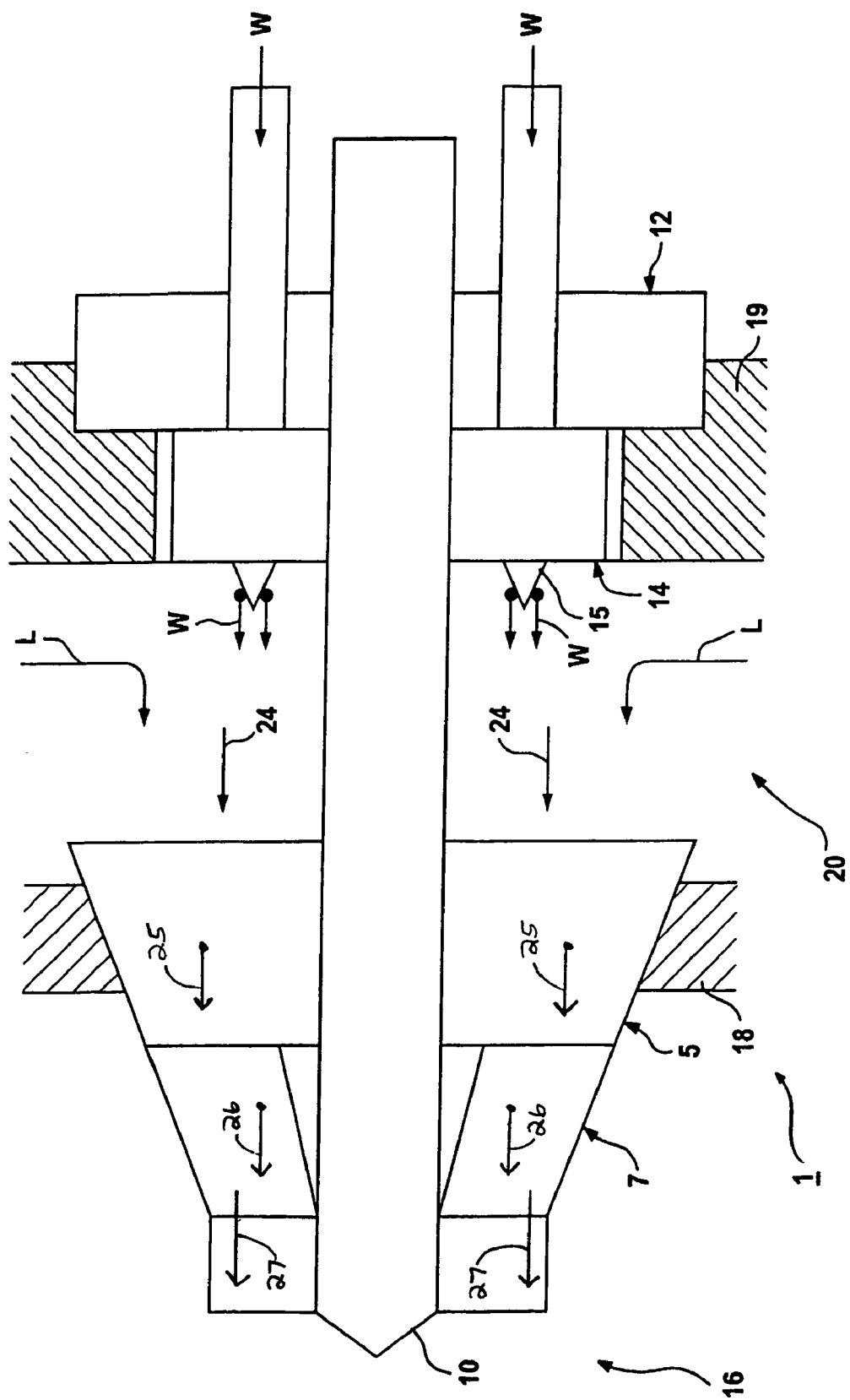

METHOD FOR OPERATION OF A BURNER AND BURNER IN PARTICULAR FOR A GAS TURBINE

CROSS REFERENCE TO RELATED APPLICATIONS

This application is the U.S. National Stage of International Application No. PCT/EP03/00109, filed Jan. 8, 2003 and claims the benefit thereof. The International Application claims the benefits of European application No. 02001456.9 filed Jan. 21, 2002, both of the applications are incorporated by reference herein in their entirety.

FIELD OF INVENTION

The invention relates to a method for operation of a burner. It relates further to a burner, in particular for a gas turbine.

BACKGROUND OF INVENTION

In the case of a turbine, in particular a gas turbine, which is driven by means of a fossil fuel, a number of burners are generally provided, these being located in a combustion chamber in the turbine. The function of the burners is essentially to effect reliable ignition of a fuel mixture which is fed to the combustion chamber, in order to produce the hot gas required to drive the rotor blades of the turbine. In doing this the combustion process should convert the fuel mixture with the highest possible efficiency, while producing the lowest possible proportion of pollutants such as NOx.

To this end the fuel mixture fed to conventional burners is a fuel/air mix, combined at the same time with atomized water. To achieve this, the substances mentioned are fed to the burner via a lance which projects into a combustion space in the combustion chamber. Here, the primary function of the atomized water is to reduce the pollutants, particularly NOx, which are produced during the combustion process. The atomized water is fed in by injection into the center of the flame for the burner concerned.

A disadvantage of this method is that—in spite of its NOx-reducing effect—the direct injection of the water as mentioned, into the center of the flame, leads to an instability in the combustion process, particularly in respect of the stability of the flame produced by the burner, because the flame is partially extinguished, and/or inhibited by the water fed into it. If such extinction effects occur at several burners, the combustion process is unable to proceed in a stable and continuous manner.

SUMMARY OF INVENTION

Consequently, the object of the invention is to specify a method for the operation of a burner, and the burner itself, in particular in a gas turbine, which avoid the disadvantages of the known methods and in particular ensure a stable and continuous combustion process.

In respect of the method, the object is achieved according to the invention by a method for the operation of at least one burner, in particular in a gas turbine, where the burner is fed with combustion air, water and a fuel, whereby a first step mixes the atomized water with the combustion air to form a water/combustion air mix and, in a second step, this water/combustion air mix is mixed with the fuel to form a water/combustion air/fuel mix.

The term water as used here also includes water vapor. A method in accordance with the invention is also called "wet combustion".

The method in accordance with the invention is a two-stage method (two-phase premixing) in terms of the preparation of a mix which is to be fed to the burner, unlike the familiar single-stage method under which the mix is produced and fed to the burner in one step.

The method avoids the direction injection ("spraying") of water into the center of the flame. As a consequence, the combustion process is particularly stable and continuous.

In an advantageous embodiment of the invention, the burner takes the form of a hybrid burner which can be operated both with gas and also with oil as the fuel, and the burner is linked to a gas premix line and an oil premix line.

Hybrid burners of this type are often used with gas turbines to allow them to be operated with two alternative fuels.

With a hybrid burner, there are normally two separate premix lines, which can take the form of a ring line in which, depending on the intended operating mode of the gas turbine in terms of the fuel with which it is fed, the appropriate fuel is fed in and is mixed with combustion air. The premix line for other fuel is then unused, and can be used for feeding the water.

In a further form of embodiment of the invention, the burner is operated using oil as the fuel, and the water is fed to the gas premix line.

In this form of embodiment, the hybrid burner is operated using oil as the fuel; in this mode of operation (oil mode), the gas premix lines have no function insofar as they are not being fed with gas as the fuel. This fact is exploited in order to give the gas premix line a new function during oil mode operation. The water is fed into the existing gas premix line, so that no separate water feed line is necessary.

In this case, there is a uniform atomization and vaporization of the water (which is to be injected) and a uniform mixture of this with the combustion air before this combustion air, supplemented with water and/or water vapor, is fed to the burner with the oil, injected via the oil premix line, preferably to the region of the burner's so-called pilot flame.

In another form of embodiment of the invention, the hybrid burner is operated using gas as the fuel; in this mode of operation (gas mode), the oil premix lines have no function insofar as they are not being fed with oil as the fuel. This fact is exploited in order to give the oil premix line a new function during gas mode operation. The water is fed into the existing oil premix line, so that no separate water feed line is necessary.

In this case, there is a uniform atomization and vaporization of the water (which is to be injected) and a uniform mixture of this with the combustion air before this combustion air, supplemented with water and/or water vapor, is fed to the burner with the gas, injected via the gas premix line, preferably to the region of the burner's so-called pilot flame.

A valve will preferably be provided, in particular a so-called three-way valve, by means of which the water can be fed either to the gas premix line or the oil premix line, depending at any instant on the operating mode of the burner in respect of the fuel which is being fed to it.

This will ensure that, during operation of the gas turbine, water is fed into the "correct" premix line, that is into the one to which at any instant no fuel is being supplied, so that it can be used for feeding the water. A change in the fuel therefore also results in a change in the point to which the water is fed: in oil mode the water is fed to the gas premix line, and in gas mode to the oil premix line, via the three-way valve.

The invention leads further to a burner, in particular in a gas turbine, for which a first means is provided for mixing water and combustion air to form a water/combustion air mix, whereby the water is atomized, and for which an additional second means is provided, different from the first means, for mixing the water/combustion air mix with a fuel to form a water/combustion air/fuel mix.

It is advantageous if the burner takes the form of a hybrid burner, for operation using gas and oil as alternative fuels, and the burner is connected to a gas premix line and an oil premix line.

In another advantageous form of embodiment of the invention, the water is fed into the gas premix line.

When this is done, the burner is operated using oil as the fuel and the gas premix line which, in this operating mode is not used for feeding fuel, is used to supply the water.

In a further advantageous form of embodiment of the invention, the water is fed into the oil premix line.

In this case the burner is operated using gas as the fuel and the oil premix line which, in this operating mode is not used for feeding fuel, is used to supply the water.

It is advantageous if a valve, preferably a three-way valve, is used to feed the water into either the gas premix line or the oil premix line, depending at any instant on the operating mode of the burner in respect of the fuel which is being fed to it.

An exemplary embodiment of the invention is explained below in more detail.

BRIEF DESCRIPTION OF THE DRAWING

The diagram:
FIGURE shows a longitudinal section through a burner in accordance with the invention

DETAILED DESCRIPTION OF INVENTION

A burner 1 in accordance with the invention takes the form of a hybrid burner for operation with either oil or gas as alternative fuels. It comprises a gas premix burner 5, an oil premix burner 7, plus an oil and gas diffusion burner and pilot burner 10. It includes in addition a burner end-plate 12 and a water/water vapor premix injection device 14.

The tip of the burner's oil and gas diffusion burner and pilot burner projects into a combustion chamber 16. The burner end-plate anchors the burner, on the combustion chamber side in the region of the gas premix burner against a combustion wall 18, and on the gas turbine external wall side against an external wall of the gas turbine 19.

Between the combustion chamber wall 18 and the external wall of the gas turbine 19 there is an air duct 20, by means of which combustion air L is fed to the burner 1. Water W is fed to the water/water vapor premix injection device 14.

No further details are shown of how the fuel is supplied to the burner 1; if the fuel is oil, then it is fed to the oil premix burner 7; if gas is used as the fuel, then it is fed to the gas premix burner 5.

When the burner 1 is in operation, the water W and/or water vapor is fed into the water/water vapor premix injection device 14, which atomizes it by means of jets 15 and injects it into the air duct 20.

In the air duct 20, the water W mixes with the combustion air L to form a water/combustion air mix 24. This is then, depending on the type of fuel which is currently being supplied, fed on into the gas premix burner 5 or the oil premix burner 7, where the water/combustion air mix 24 mixes with the gas fuel 25 or the oil fuel 26 to form a water/combustion air/fuel mix 27, which is fed to the oil and gas diffusion burner and pilot burner 10 for combustion in the combustion chamber 16.

With the burner 1 in accordance with the invention, the formation of a combustion mix thus takes place in two steps. In the first step, the water is mixed with the combustion air L to form a water/combustion air mix 24, and in a second step this water/combustion air mix 24 is mixed with the fuel to form a water/combustion air/fuel mix. This latter mix is then used for combustion, using the oil and gas diffusion burner and pilot burner 10.

Unlike the familiar burners, this form of embodiment realizes a separate water/premix injector arrangement, and is associated with a change in the concept of the familiar burners; the result represents a three-substance premix burner for gas, oil and water.

It is also conceivable for the water/water vapor premix injection device 14 to be arranged immediately before the gas premix burner 5, as it were at the point of entry of the combustion air L into the burner. With this arrangement, when either of the expected fuels (gas or oil) is burned the three substances are mixed together in two steps, in accordance with the invention. The arrangement of the water/water vapor premix injection device in front of the burner is a solution approach to the implementation of a burner 1 in accordance with the invention for which a familiar burner design would only require minor changes.

This means that familiar and proven burners can be called on as a starting point in designing a burner 1 in accordance with the invention, for example by retrofitting to a familiar burner the water/water vapor premix injection device 14 with its jets 15.

Apart from a reduction in the oxides of nitrogen produced during combustion, which the invention is intended to achieve, augmentation of the turbine power is also achieved, in particular when a form of embodiment as shown in the figure is used.

Further, the invention reduces the temperature of the cooling air which is extracted from the combustion air. This results in an improvement in the cooling of the turbine vanes.

The invention claimed is:

1. A method for operating a burner in a gas turbine, comprising:
   in a first mixing step, mixing atomized water with combustion air in an air duct to form a water/combustion air mix;
   feeding the water/combustion air mix to a fuel premix device disposed downstream of the air duct and, in a second mixing step, mixing the water/combustion air mix with fuel at the fuel premix device to form a water/combustion air/fuel mix; and
   feeding the water/combustion air/fuel mix to a combustion chamber of the gas turbine.

2. The method in accordance with claim 1, wherein the burner is a hybrid burner that uses gas and oil.

3. The method in accordance with claim 2, wherein the burner comprises a gas premix device and an oil premix device for mixing the water/combustion air mix with the fuel.

4. A burner in a gas turbine, comprising:
   a water/water vapor premix injection device for first mixing atomized water and combustion air in an air duct to form a water/combustion air mix;

a fuel premix device for receiving the water/combustion air mixture and for secondly mixing the water/combustion air mix with a fuel to form a water/combustion air/fuel mix; and a diffusion burner device.

5. The pilot burner in accordance with claim 4, wherein the fuel premix device is a hybrid device, that uses gas and oil as alternative fuels, and the fuel premix device comprises a gas premix device and an oil premix device.

6. A burner for a gas turbine comprising:

a first means for mixing, the first means for mixing receiving water and combustion air and forming a water/combustion air mixture;

a second means for mixing disposed downstream of the first means for mixing, the second means for mixing receiving the water/combustion air mixture and a fuel and forming a water/combustion air/fuel mixture; and a combustion chamber disposed downstream of the second means for mixing, the combustion chamber receiving the water/combustion air/fuel mixture for combustion.

7. The burner of claim 6, further comprising a diffusion burner comprising a tip projecting into the combustion chamber.

* * * * *